United States Patent
Million et al.

(10) Patent No.: US 6,742,176 B1
(45) Date of Patent: May 25, 2004

(54) SECURE FLEXIBLE PLUGIN SOFTWARE ARCHITECTURE

(75) Inventors: Tony Million, San Francisco, CA (US); Al-Riaz Adatia, Sunnyvale, CA (US); Andrew McCann, San Francisco, CA (US); Nicholas Vinen, San Francisco, CA (US)

(73) Assignee: Lycos, Inc., Waltham, MA (US)

(*) Notice: Subject to any disclaimer, the term of this patent is extended or adjusted under 35 U.S.C. 154(b) by 388 days.

(21) Appl. No.: 09/593,572

(22) Filed: Jun. 14, 2000

Related U.S. Application Data

(60) Provisional application No. 60/139,158, filed on Jun. 14, 1999.

(51) Int. Cl.[7] .................................................. G06F 9/44
(52) U.S. Cl. .................... 717/120; 717/162; 717/169; 717/175; 719/332
(58) Field of Search .................... 717/120, 162–163, 717/165, 167, 168–169, 171–175, 176–178; 709/224, 231, 316, 328, 331–332, 103; 707/9; 713/167, 201; 715/514

(56) References Cited

U.S. PATENT DOCUMENTS

| | | | | |
|---|---|---|---|---|
| 5,640,522 A | | 6/1997 | Warrin | 345/732 |
| 5,842,014 A | * | 11/1998 | Brooks et al. | 718/103 |
| 6,133,898 A | | 10/2000 | Ludolph et al. | 345/790 |
| 6,148,336 A | * | 11/2000 | Thomas et al. | 709/224 |
| 6,151,599 A | * | 11/2000 | Shrader et al. | 707/9 |
| 6,181,342 B1 | | 1/2001 | Niblack | 345/635 |
| 6,239,798 B1 | | 5/2001 | Ludolph et al. | 345/788 |
| 6,243,102 B1 | | 6/2001 | Ruff et al. | 345/619 |
| 6,289,450 B1 | * | 9/2001 | Pensak et al. | 713/167 |
| 6,385,729 B1 | * | 5/2002 | DiGiorgio et al. | 713/201 |
| 6,496,842 B1 | * | 12/2002 | Lyness | 715/514 |

* cited by examiner

*Primary Examiner*—Antony Nguyen-Ba
(74) *Attorney, Agent, or Firm*—Fish & Richardson P.C.

(57) ABSTRACT

A secure flexible plugin architecture allows plugins to dynamically interconnect in highly flexible arrangements to permit the handling of many kinds of file formats. Interconnection is self-administered through a supervised volunteer system. In a media player example, the system is capable of handling files with multiple layers of formatting such as encryption, compression, etc. The resource selection is completely transparent and a user need not be concerned about the packaging of resource files. A security mechanism that is enforced at the level of the plugins is also provided. Plugins can opt in or out depending on the other components in the dynamically generated chain of plugins used to filter or convert a file.

4 Claims, 4 Drawing Sheets

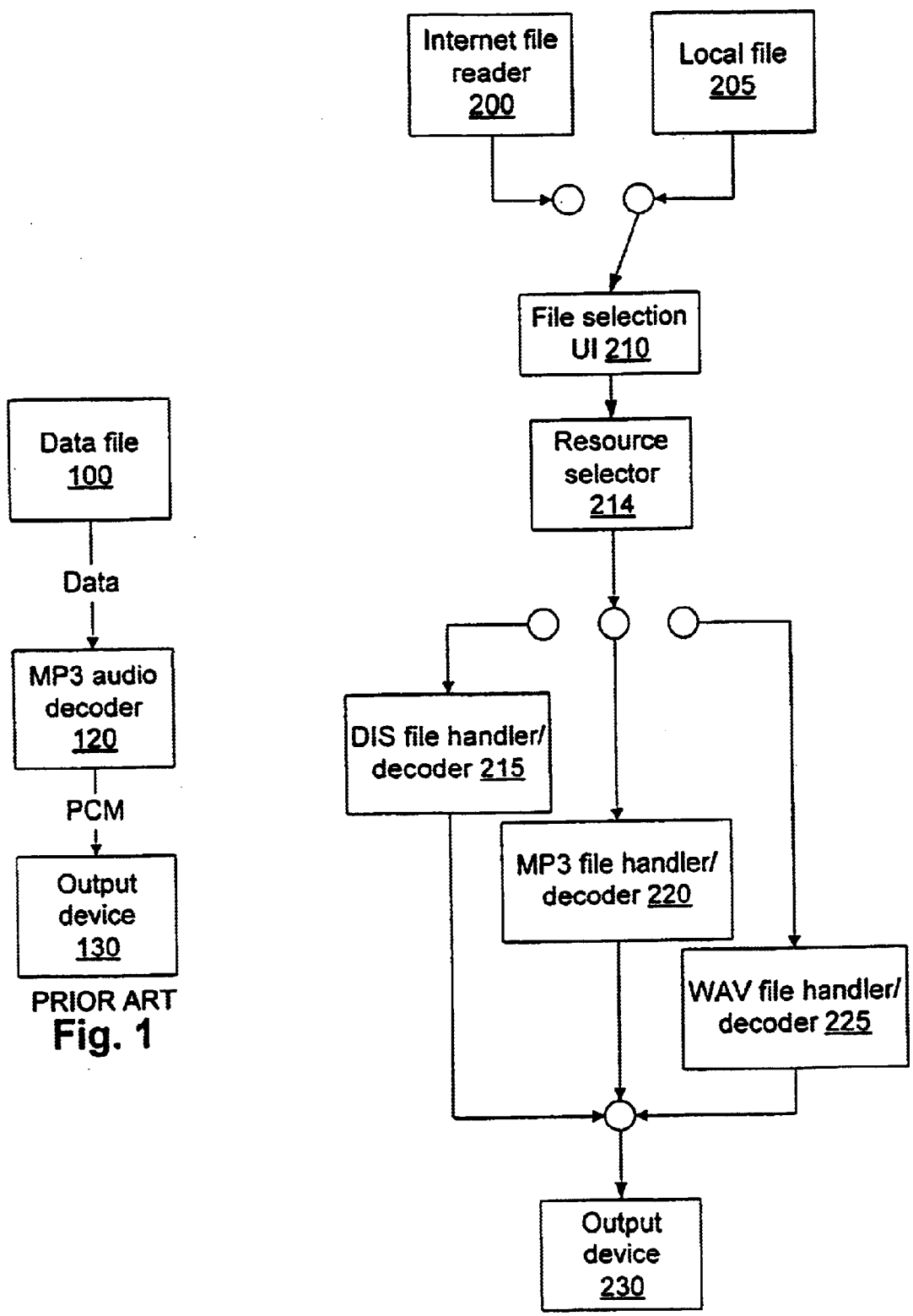
PRIOR ART
Fig. 1
PRIOR ART
Fig. 2

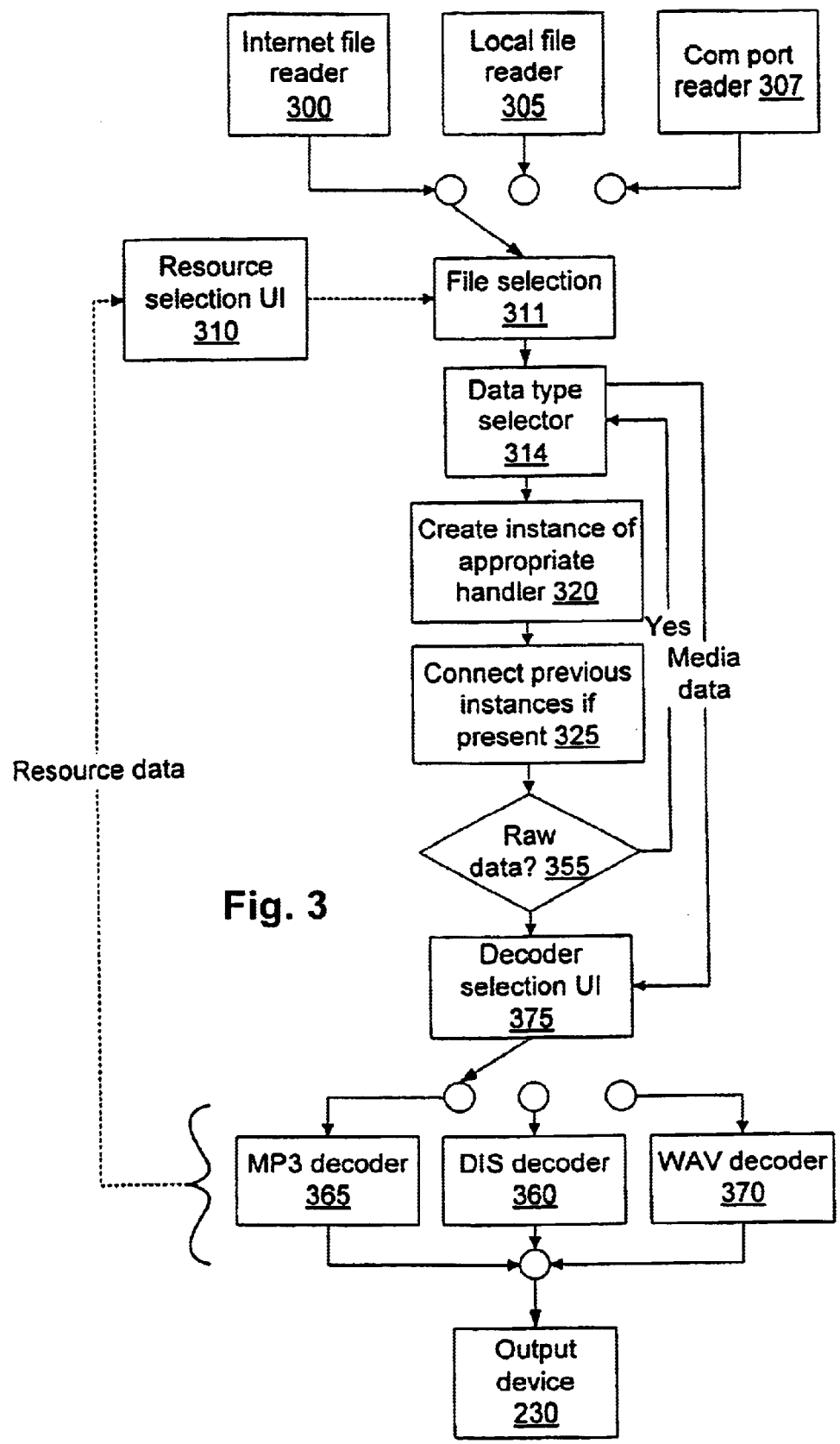
Fig. 3

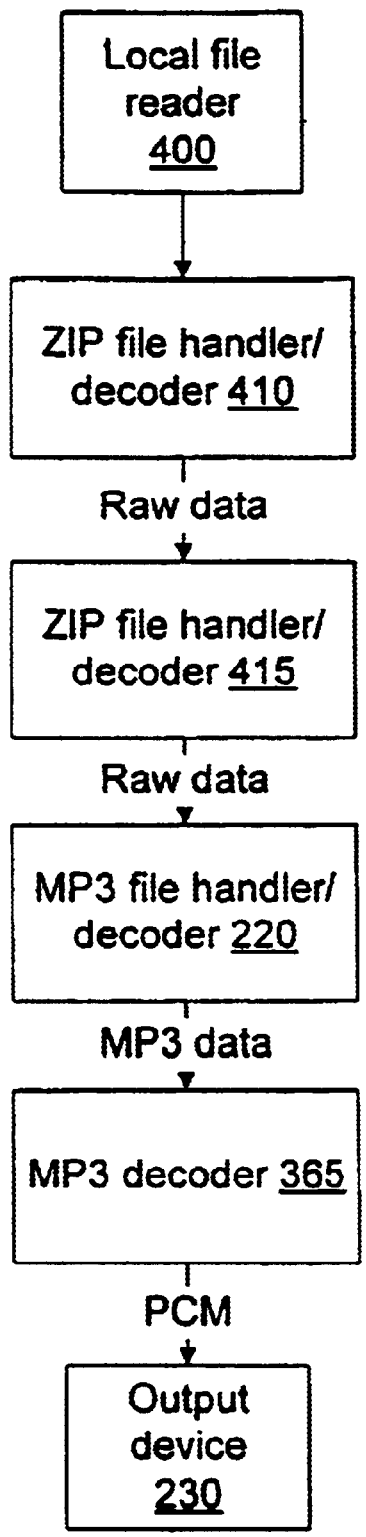
Fig. 4

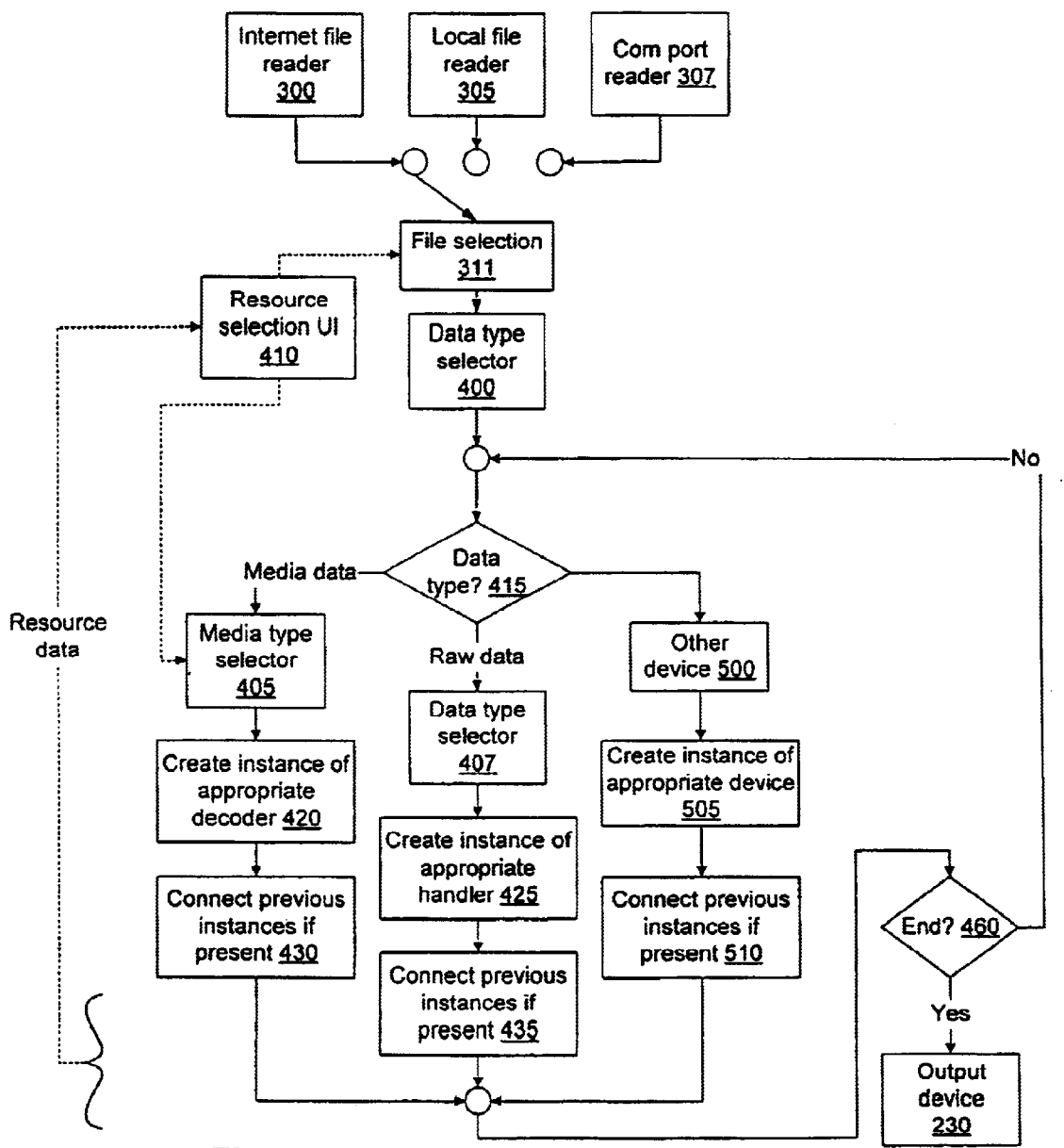
Fig. 5

SECURE FLEXIBLE PLUGIN SOFTWARE ARCHITECTURE

CROSS REFERENCE TO RELATED APPLICATIONS

The present application claims priority to U.S. Pat. No. 60/139,158 filed on Jun. 14, 1999 for "MEDIA RESOURCE MANAGER/PLAYER" the entirety of which is hereby incorporated by reference as if fully set forth herein.

BACKGROUND OF THE INVENTION

1. Field of the Invention

The invention relates to software that employs plugin components. More particularly it relates to such software used to manage, modify, and reproduce media resource data from files, streaming sources, and other sources.

2. Background

Digital audio player software application manages audio data from various sources such as serial, file, and streaming data via networks, disk storage, optical storage, etc. and compressed (or uncompressed) according to various different protocols. The application also outputs such files to various different output devices, such as visual output software or hardware, hardware digital-audio converters (DACs), files, broadcast systems, etc. To provide flexibility, the application is designed to accept plugin software components to provide for feature upgrades. For example, a plugin might be added to permit audio data to be visualized during simultaneous playback in a way that is similar to a visual light show that might be employed at a dance hall or concert. The visual output might be applied to a projector, a computer screen, or an external light array. Plugins, in addition to permitting output to varying devices, may also allow modification of sound files such as alternative file formats, resampling, sound effects and distortions, etc. Such modifications, of course, may be inherent in certain types of output conversions as well.

The invention may be used in the environment of digital audio players. Currently, media players employ plugin technology that allows features to be upgraded using modular components that can selectively replace existing components or add new features to an existing program. Plugin technology is usually associated with the Internet, for example it is used to provide web browsers with the new capabilities, such as for reproducing media files, viewing 3-D interactive media, playing sound and video files, performing calculations, etc.

One example of a program that uses plugin technology is a streaming media player that runs on PCs. Features may be added by installing new plugin components. For example, the ability to view animations that respond to music could be added to a streaming media player application that reproduces sound from compressed audio files. Another way that such an application could be enhanced is by adding a plugin that is capable of reading a new source file format.

Referring to FIG. 1, an example architecture for a streaming or file media player is Winamp by Nullsoft, Inc. The system hosts plugins for audio decoding 120 which may be any of various different formats such as MP3 120. In this architecture, the system accepts a request from a user interface for a particular file and based upon the extension (e.g., WAV, MP3, etc.) it passes it to a plugin that has been registered to handle that format. The plugin then reads the file from the resource and decodes it to generate the output audio (e.g., pulse code modulated) stream to an output device 130. This arrangement requires that the system designer know in advance the capabilities of each plugin. The structure is monolithic and therefore does not allow reading, file format handling, and decoding functions to be upgraded without a new monolithic plugin.

Referring to FIG. 2, a more flexible architecture is exemplified by DirectShow® by Microsoft®. In this architecture, the host system selects a file reader plugin based on the requirements of the resource selected by the user. This is done dynamically through a file selection user-interface (UI) that permits the user to select a file to be played. The selection is based on the match between the selected resource and the available reader plugins. Two examples are shown, an Internet file reader 200 for http files and a local file reader 205 for local (e.g., disk) files. The output of the selected file reader (the local file 205, in this case) is connected to the input of an appropriate decoder. Here again, one of a variety of plugins may be available such as for DIS audio format files 215, for MP3 files, and for WAV files. The output of the selected decoder is then applied to the output device.

The selection of decoder in the above system occurs as follows. A convention is established whereby each decoder provides to the system a bitmask the system then uses to test the data stream. A predefined amount of data is applied to the bitmask and if the result is a particular predefined sequence (e.g., all "1" s or all "0 " s), the plugin is accepted to decode the data. As a result, if there are any errors in the file or substantial misalignment between the data stream and bitmask, the test will fail.

Note that in both of the above architectures, there may be more than one output in the resulting stream. For example, a decoder plugin could produce audio and video streams.

The architecture of FIG. 2 overcomes the inflexibility of that of FIG. 1, but is incapable of handling files packaged in any form other than one that can be decoded directly into an audio stream by a monolithic decoder plugin. Such file formats may even have been used to embed multiple files in a single wrapper such as a ZIP file and such an architecture has no mechanism for dealing with such cases. Also, the host system must make decisions as to which inputs and outputs to connect. A plugin may offer different features from those the host system has been programmed to recognize, such as an ability to handle an unknown file format, the ability to correct errors in certain types of files, the ability to generate outputs that the host does not recognize, etc. This limits ability of the host to take advantage of plugin's capabilities without changes to the host system and its ability to manage media files embedded in non-media-file formatting or encrypted.

Another issue that arises in connection with plugin architectures is security. For example, a user may be authorized to play a file, but not authorized to reproduce it. Or the user may be allowed to reproduce it, but only in a certain format. These rights may arise in connection with a prior payment or simply by virtue of the media type. In prior art systems, security is administered by the host system. This requires the host recognize when a security situation exists with a plugin that is going to be used and responding to it. This also limits the variations on the options available when new plugins offer new ranges of features.

In any plugin architecture, it is necessary to authenticate components. This kind of security is intended to insure that unauthorized things do not happen such as the introduction of viruses. The technology for authenticating plugin components is mature and outside the scope of this document. In the area of media reproduction, modification, and playback, there is an entire realm of uses that media authors and vendors would permit, if plugin components were restricted to interacting in only predefined ways. For example, a user could pay a very low price for an audio file if the seller were assured that the file could only be played once. A consumer could have a tremendous library of music instantly at his disposal, paying only for the use of the volumes in the library. This kind of scheme might be readily implementable in a native application. But in an application that admits all manner of plugin components it presents a formidable problem. How does the native application insure that plugin components will not behave in an unauthorized way? One way is to fall back on a gate-keeping function of the host system, which gave rise to the authentication systems that are in use today. The user or the application either permits a plugin to operate in the application or not. That is, the developer provides mechanics in the player that will either accept or reject a plugin based on the identity and authentication of the plugin. A common example of this is web browser plugins. Often users are queried as to whether the plugin should be accepted or not. The issue of whether the user has rights to distort, reproduce, play, transmit, etc. medial files (images, sound, movies, pictures, etc.) is a function of what the developer has provided either natively in the application and what plugins are permitted to connect with the application. Whether a plugin has a role in the system to distort sound, convert sound to images, modify images, reproduce images, add sound to video, etc. is a function of the native and plugin elements making up the application. What plugins are resident is a result of the gate-keeping function and that is about the extent of how such issues are managed.

SUMMARY OF THE INVENTION

To allow a user to select various resources, the simple model of FIG. 1 must be augmented. The user might want resources files located on Internet sites, the user's computer drive, etc. The player should thus have some kind of selection device to allow the user to see the selections available and indicate the file to be played. To provide this flexibility, the system may provide different readers, each for a different type of source device (e.g., Internet file, disk file, etc.) In addition to reading the files, each file may contain text and other kinds of data. For example, a typical MP3 file will contain the title and other data associated with the audio that is packaged in it. The files may also contain multiple resources. All of these variations (multiple resource files, additional non-audio information, etc.) depend on the file format. While the source device may be independent of the file format, the compression protocol is usually tied to the file format. Most file formats are linked with a particular encoding format, for example Sound Interface Design (SID) files. In such cases, the special file handling required for extracting multiple resources from a combined file would, as a matter of normal design choice, be handled by the decoder specific to the format of the chosen file. The configuration of FIG. 2 addresses these issues to some extent. However, the invention involves some fundamental departures. These are described below.

A flexible plugin architecture provides some over-arching features that permit a system to upgrade its capabilities without being limited by the host system's familiarity with them. The first component is that plugins are programmed to provide a parameter in response to a role proposed for the plugin to play in the host system. The parameter reflects the plugin's competence in handling the role. For example, a file reader can return a parameter that reflects its ability to handle a particular file format.

In the preferred embodiment of the invention, the parameter has two prongs: (1) an accuracy rating that results from testing the plugin on the task and (2) a figure of merit that is permanently associated with the plugin and indicative of the plugin's quality of performance irrespective of the particular task. Metaphorically, this arrangement permits the host system to ask for volunteers from among the various plugins. The figure of merit may be assigned to each plugin and obtained simply by querying the plugin or stored by the host when the plugin is registered with the host. The accuracy rating may be generated by testing the plugin. The host system, when it has an output to connect, such as a path to a file or an unknown data type emanating from a plugin, may apply the data to the plugin and observe the response. For example several leading bytes of a data stream may be passed to the plugin which the plugin may use to determine its ability to deal with the format. In a preferred embodiment, each candidate plugin is queried as to what it needs to evaluate the data source. For example, one plugin may request the first eight bytes and another, simply the first two bits of the data stream. The host system may supply the requested data and the plugin, in response, will generate the figure of merit by testing the data stream in an appropriate fashion such as by applying a digital mask or attempting to "play" the file until an error free output is identified.

One of the reasons the above volunteer-system is superior to the embodiment of FIG. 2 is that a file format handler or decoder plugin can accept any amount of data its programming permits it to inspect. For example, an MP3 decoder could attempt to locate a start header that is far from the expected location at the beginning of the file. If the architecture of FIG. 2 were used, the file would be disaffirmed by the plugin because it failed to match the specified bitmask. Also, plugins may upgrade their own robustness in connection with handling files with unusual formatting such as included data, bad data, offsets, etc. Here the plugin tells the system what it needs to evaluate the file and then tells the system whether it can handle the file or not.

Another aspect of the flexibility of the system is an inherent structure that separates the role of file format handler plugins from the decoders. This allows the unpacking of compressed, bundled, encrypted, or otherwise formatted files or groups of files. By disconnecting the function of handling a file format from the step of decoding, resources embedded in various file formats can be managed by the flexible system. This flexibility may be exploited by further building into the host system a recursive structure permitting multiple layers of formatting to be managed.

There are two levels of recursion that may be used. In the first, the format handler function is permitted to be performed iteratively. This makes it possible to unpack a file that has more than one layer of file formatting. In this kind of host system, a plugin volunteers to handle a raw data stream generated by a file reader. The system generates an instance of the file volunteered format handler and identifies any outputs existing in the instantiation of the format handler or generated by the instantiation (depending on whether the plugin was requested to generate an output or not). If an output is generated and required to be tied further to another format handler instantiation, that is, if the output data is raw data again rather than media data, another plugin is requested to volunteer and an further instance of a format handler plugin is generated and the output connected to it. The system then takes stock of all the outputs generated (one plugin can have more than one output) and responsively to the command, idenfifies an appropriate input for these output either by finding a file handler plugin, if it is raw data or a decoder if it is media data.

A second level of recursion places the decoders and file format handler plugins at the same point in the recursion loop. This permits an output of a decoder to be looped back and tied to a further instance of a format handler or further instance of a decoder. For example audio data might be sent to a downsampler before being written to a file, or to a visual display for a sound-activated light show, or could be sent to a signal analzyer, etc.

The recursive architecture may be generalized as follows. A plugin from a pool of plugin types is selected using a volunteer process whereby a plugin requests data from an output of an upstream process. The system supplies the requested data and a quality rating is generated by the plugin. The system uses the quality rating to select a plugin; the volunteer. An instance of the volunteer is generated. Any downstream outputs generated after applying the upstream process (i.e., the plugin possesses or generates in response to the data and system parameters a given number of outputs), are placed in a list of outputs to be connected. The generation of each output is an event that triggers the volunteer process for associating a plugin input with an upstream output. The system does this iteratively, or recursively, until all outputs have been tied. If an output is not to be used, it may be tied to a null plugin or host process.

Note that the flexible architecture approach, as will be recognized by persons skilled in the art, may be used in a variety of software systems aside from media management applications. For example, file conversion utilities, Internet browsers, signal analysis instruments, business application software, and any application or operating system program that uses plugins or interchangeable plugin-like components can make use of features of the invention.

In a plugin type architecture, as discussed above, it may be advantageous for the host system to query each handler/decoder to identify one that will "volunteer" to process the file. When a multiple-resource file is selected by the user in the first instance, e.g., a DIS file, the handler must invoke some operation to obtain a selection from the multiple-resource set before decoding the data in real time. This architecture has some shortcomings from both the user interface standpoint and from a software efficiency standpoint, especially in the context of an architecture that permits multiple plugins. First, the user cannot view all resources transparently. To address this need a separate operation is provided that examines the contents of files, data sources such as data ports or Internet connections, and generates a data file containing a list of resources. In the process of examining the content of each file or set of files, the system will employ the recursive architecture described above and can generate a map that indicates the path to each resource. This map may be stored along with the resource so that when the user selects a resource through a user-interface, the chain of plugins required to unpack and decode the resource can be generated (connected end-to-end as quickly as possible. Alternatively, the system can search for the file as it unpacks the file or set of files. In such a case it may correlate only the resource with a particular file from a set or even simply store the title of the resource. Note that we have assumed the resource contains an identifier that can be displayed through a user interface. This is not always the case and the system could generate a unique tag for a resource that does not contain an identifier or generate one from a portion of its contents (e.g., borrow the first line of a text file and use it as a name).

In the resource-selection UI, resources are correlated with appropriate files. The robust recursive architecture described above handles multiple-resource files that may be packed under layers of encryption, compression, etc. The architecture assumes this is the norm rather than the exception and with the assumption that any number of layers of file compression or packaging might exist. Prior art approaches may provide a solution to handle such bundled resources, but their structures are more monolithic and provide little flexibility for upgrade of features.

The user interface is built around a resource-based selection paradigm rather than a file-based selection paradigm. The user selects, not a file, but a specific resource. The resource does not have to be resident on the local system and can be merely a pointer to a resource. If the user selects a file to add to the user's resource list, the system examines the file and updates a single resource list from which the user can then select the desired resource.

The resource selection UI contains a list of all resources. The files in which they reside may be available to the user, but are not the primary basis for selecting a resource. The user selects a resource to be played and the system invokes the appropriate data source, channels it through the appropriate reader and into the appropriate decoder for playing. When a new file is identified to the system, the file is preferably examined by all resident file handlers to determine the type of file it contains using the volunteer-system recursive architecture described above. The process is iterative and results in each final output being mapped to an identifier and a data structure that indicates how to get to the file (i.e. through which plugins' inputs and outputs, which files at each level of unpacking, and in what order) to arrive at the final resource. A playlist generated by the resource selection UI also stores the secondary data relating to the resources including the structure that indicates how to unpack and decode the resource.

The architecture is much more friendly to plugin systems because the decoder function is handled separately from the file handling. By providing the iterative framework, multiple embedded formats can be processed. The Playlist may store all information to process and read the file without permanently expanding or separating the embedded file. So, a file found to contain multiple DIS files and ZIP files all embedded in a single ARJ file could be handled without permanently unpacking either the outer layer or any of the inner layers. (Of course, these may be temporarily unpacked for the purpose of unpacking the desired resource and this is a matter of various design considerations peculiar to the particular application.)

Such a plugin architecture inevitably raises security issues because of the risk of malicious software components that might damage user's systems by introducing viruses and that might be used to make unauthorized conversions of data that violate the copyrights attaching to that audio data. In addition, a flexible plugin architecture that provides many layers in the conversion process, between source and output, in turn provides numerous taps for unauthorized use of the data.

In a highly flexible plugin architecture such as described above, because it permits so many possible relationships between plugin components, the issue of security is particularly complex. A solution to this is an alternative approach to plugin security. Suppose that plugins and the native application could create independent bilateral or multilateral contracts between themselves without relying on the host system to administer them. Add to that the feature of permitting outside media suppliers to negotiate terms in the same kinds of contracts. The host application may generate a list of terms that could be incorporated in such contracts and the authentication system used to insure that the right "parties" are interacting according to the terms of the contract. Or the host system could simply allow the plugins to indicate whether they will accept an input from a particular source or will permit output to a particular sink. The invention includes an implementation of this basic idea.

The following is an example of a plugin-administered security contract. A user of an audio player wants to install a plugin that generates a visual image that can play in synch with audio files. The application permits the plugin to be installed. The plugin must then negotiate with the application on a resource by resource basis to determine if a given resource stream may be applied to the plugin. In the instant case, suppose that the resource is a stream containing musical data. The musical data file itself may contain an identifier. Through a contract with the application developer, the audio file owner can mark (e.g., watermark) his file with an authentication data that indicates to the application a unique identity for the source or class of the file. This authentication data tells the application that this file is to be accorded a certain class of treatment. The class of treatment may be specified by a list of allowed processes to which the file's owner has agreed to permit its contents to be subjected to. The plugin, in turn, has authentication data and an indicator of the kind of data that it accepts. So, in this example, where the plugin generates a synchronous video display, the plugin might request as its input, 8-bit lossy data, which can be crude music data or a downsampled version of a higher bandwidth music file. Such data would not necessarily sound appealing, but it can be used to drive a sophisticated synchronized video display to good effect. The above data now establishes the information necessary for the application to make a decision as to whether to permit the resource data to be applied to the plugin. The class of treatment may specify that there are no restrictions on the application of a downsampled version of the data file. (A reason for having such a loose provision with regard to lossy data is that the media owner's concern is with broadcast, reproduction, or other use of its material and these concerns are not as significant when the owner can be assured that the full file will not be accessible to the plugin.) The application can then make the decision to go ahead and apply the lossy data to the plugin. An alternative implementation of the same idea is to permit the contract not between the resource owner (via the resource file) and the video plugin "consumer," but between the resource owner and a plugin channel that takes in full music file data and generates 8-bit lossy data for output. In this case, the latter plugin downsampler would have to authenticate itself to insure that the media owner can regard it as trustworthy. Of course the contract between the media owner and the downsampler plugin in this example is enforced by the application. It is also assumed that the application, aside from being enforcement-level arbiter, would also provide the framework for these contracts because the application must understand the possible array of terms that it must enforce.

From a technical standpoint, all the pieces of the above interaction puzzle are well established. The contract terms can be embedded in a digital watermark or explicitly written into a header of the file. Plugin components can contain contract as well. One plugin can agree to be connected to accept data or apply to data only to certain other plugin components and such connections can be further dependent on the type of data to be exchanged.

For another application example, consider an audio player application containing (1) a plugin that saves data in a particular compression format, (2) a plugin that acts as a front end to a DAC, and (3) a plugin that pitch bends the real-time audio stream. Also consider that the user of the player has contingent access to (1) a video file, (2) a professional music file, and (3) an amateur music file. The video file might contain restrictions that it will not allow itself to be applied to the data compression plugin unless certain rights are purchased. Those rights could be written into the video file by the server used to deliver it through a secure transaction. The detection of the presence of those purchased rights (reproduction rights) would enable the contract enforcer, the application, to apply the data to the compression plugin. The copying privilege in this is not universal. Application to the compression plugin is dependent on the authentication of the plugin. In this case, the media owner might approve a particular authentic plugin because it knows that the copy permission is not reproduced by the compression operation. Thus, the reproduced file does not contain the copy permission and the user cannot thereby extend copy privileges to others. In fact, in this case, he can only make one compressed copy. In another variation, the amateur music file may contain no contract restrictions. The video file may contain no restrictions with regard to application to the authorized authenticated pitch bender because the pitch bender is known to filer out essential synchronization information rendering the video file unusable as a video data stream.

The professional music file owner may permit its data to be applied to the authorized authenticated DAC because it knows that it will be reproduced only ephemerally. The privilege may have been extended, as in a previous example, through a payment and a secure transaction through a network server. Many different combinations are possible.

It is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

The invention will be described in connection with certain preferred embodiments, with reference to the following illustrative figures so that it may be more fully understood. With reference to the figures, it is stressed that the particulars shown are by way of example and, for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWING

FIG. 1 is a functional illustration of a plugin architecture according to an embodiment of the prior art.

FIG. 2 is a functional illustration of a plugin architecture according to another embodiment of the prior art.

FIG. 3 is a functional illustration of a plugin architecture according to an embodiment of the invention in which file format handlers may be instantiated and connected iteratively to permit the handling of multiply layered file bundling.

FIG. 4 is an illustration of how a series of instantiations of plugin components may be generated by the processes enabled by the embodiments of FIGS. 3 and 5.

FIG. 5 is a functional illustration of a more general embodiment in which plugins other than just file format handlers are iterated through to permit a more robust capability for handling embedded files.

DETAILED DESCRIPTION OF THE PREFERRED EMBODIMENTS

Referring to FIG. 3, a host system incorporates multiple groups of plugins including alternative file readers 300 (for Internet files—http type), 305 (for local files), and 307 (for files sourced from a data port). The above list is not comprehensive and may include reader plugins of any sort including readers supporting infra-red ports, USB, PCMCIA, linear flash memory devices, ATA devices, Internet ftp, http, etc., keyboard, video, radio, television, A/D converters, etc. A user interface 310 allows a user to select from a stored playlist a resource desired to be used. The term, "use" is intended here to embrace media reproduction, copying of a data file to a storage device, feeding of data to control a process, and any other manner that data may be transferred or transformed in any manner. The user interface 310 process may incorporate a process within that permits it to associate the resource(s) selected by the user with a particular file or data source. This "playlist" and its attending data are generated as discussed above and below. The file identifier is applied to a file selection process 311 which may or may not be part of the resource selection process. The file selection process or object 310 invokes a file reader by a volunteer process or may simply employ information in the file identifier to select a reader from registration information relating to the various reader plugins. In the volunteer process, the file pointer will be given to each of the plugins and each will produce a parameter representative of its ability to handle the indicated type of file or data source. To do so, the file reader may sample data from the source to which the pointer points.

In the preferred embodiment of the invention, the parameter has two prongs: (1) an accuracy rating that results from testing the plugin on the task and (2) a figure of merit that is permanently associated with the plugin and indicative of the plugin's quality of performance irrespective of the particular task. Metaphorically, this arrangement permits the host system to ask for volunteers from among the various plugins.

The figure of merit may be assigned to each plugin and obtained simply by querying the plugin or stored by the host when the plugin is registered with the host. The accuracy rating may be generated by testing the plugin. The host system, in this case, may permit each plugin, per a request from the plugin, to connect to the data source to test its response according to the manner in which the plugin is programmed. For example several leading bytes of a data stream may be taken in by the plugin which the plugin may use to determine its ability to deal with the source device or data type.

The file selection process generates an output from one of the readers and this triggers a process of identifying a plugin to handle the output data. First the output data stream is sampled to determine its data type. Media data will be connected directly to a decoder selector process 375. Raw data will be processed by a file format handler selected using the volunteer system. The selection of the appropriate file handler from a set of plugins available, is preferably by the volunteer system discussed above. Here, in the volunteer process, in a preferred embodiment, each candidate plugin is queried as to what it needs to evaluate the data source. For example, one plugin may request the first eight bytes and another, simply the first two bits of the data stream. The host system may supply the requested data and the plugin, in response, will generate quality indicator by testing the data stream in an appropriate fashion such as by applying a digital mask or attempting to "play" the file until an error free output is identified. A permanently-assigned figure of merit may also be assigned to each plugin and used by the host system in combination with the quality indicator to select the best volunteer.

Once a volunteer is selected, an instantiation of the volunteer is generated (320) and the data from the output of the previously selected reader is applied to the input of the instantiation (325) of the file format handler. Note the latter may be any type of handler. For example, the types of handler plugins may include ones for SID, ZIP, ARJ, encryption such as PGP, etc. The host may, once the volunteer is connected, be presented with any number of outputs. This depends on whether a resource was selected to be used or whether the system is simply querying a data source to find out what resources are available (for example for purposes of constructing the playlist). The generation of an output is an event that triggers the host to attempt to find a plugin for handling the unconnected output data type. In this case, if the data type is raw data in a step indicated at 355, the data type selector process 314 is entered again and process is repeated. This is done for each output generated in the previous process. The above process iterates until the selected media resource identified or a media data source found. Then a selection process similar to the volunteer system for a media decoder is invoked as indicated at 375. The decoder plugin can be for handling any of a variety of data types such as MP# (350), DIS (360), and WAV (370). The final output may be applied to an output device which may be a disk, an amplifier, a video port, etc.

Referring to FIG. 4, an instance of the iterative (recursive) process described above is illustrated. In the example, we assume a user selected a resource on a data file. We also assume the resource is in a ZIP file that further contains one or more ZIP files, within one of which is an MP3 file. An instance of the data file handler plugin 100 is generated and an output applied to an instance of the ZIP file handler 410. A second instance of the ZIP file handler 415 receives the output of 410 and applies an output to an MP3 file format handler 220. Finally an appropriate decoder, in this case MP3, is instantiated 365 and an output sent to an output device Referring to FIG. 5, a more robust architecture functions in a similar manner to that of FIG. 3, except that file format handler plugins and decoders and other types of plugins are managed at the same point in the loop. This permits an output of a decoder to be looped back and tied to a further instance of a format handler or further instance of a decoder or to some other type of plugin. The plugins could be downsamplers, wave analyzers, visual displays that create visual effects to go with the music, etc.

In FIG. 5, at 415, the data type may be classified before entering a volunteer process or the volunteer process may be invoked without classifying the data type. In the illustrated embodiment, the data is classified if it is media data, only decoders are interacted with in the volunteer process. If it is raw data, only file format handlers are interacted with in the volunteer process. The subprocesses 405, 420, and 430 map to previously-described processes in FIG. 3, namely 375, 365, 360, 370. The subprocesses 407, 425, and 435 map to previously-described processes in FIG. 3 namely 314, 320, 325.

If the requested resource(s) has (have) been reached and connected to appropriate outputs, then the recursion loop ends at 460. Note that other types of plugins are indicated at 5500, 505, and 510. These could include plugins other than decoders and file handlers such as signal analyzers, downsamplers, encryption devices, etc.

To generate a playlist, the above process actually follows through every branch of the possible trees, but does not create a connection to an output device because no resource selection is provided to guide it. For example, if a resource is embedded in a file with other files in a single layer of ZIP compression, then multiple outputs may be generated by a single instance of the ZIP file handler. Each of these must be followed out to their respective resources to identify what resources are available. Thus, files and resources may ramify at each level of packaging and the system simply goes through each. As each output is generated, the host is triggered to tie the outputs to an appropriate plugin (or host process or device). Once this is done for a connected data source, the playlist is generated and it need not be repeated until the data source changes.

As the above process generates instantiations of plugins, during a format detection stage, security issues do not arise because only a small amount of data is normally required. A plugin demanded too much data (a pirate), the plugin would be refused. Once an end to end series is generated by the above process, this end to end enumeration of components is made available to all the plugins in the chain (which has only been connected using small amounts of data peeked through at each connection in the chain to allow the volunteers to be identified). This enumeration identifies each plugin that is currently in the chain. The plugins must be programmed to provide not only its particular information that identify it and authenticate itself. A plugin can be provided with a default set of credentials that cause it to be registered as, say, an unsafe plugin. The enumeration list then provide identification and authentication according to a predefined protocol. Again the plugins are programmed (unless they are default devices as indicated above) to list their credentials to the host system.

The enumeration list, which may also be stored in the playlist file as discussed above) may contain the following data:

1. identity of the plugin (version, etc.)
2. what (the plugin, the type of data, etc.) is connected at its inputs
3. what (the plugin, the type of data, etc.) is connected at its outputs
4. authentication data (e.g., PGP or watermark, etc.) to allow other plugins in the chain to determine that it is authentic and not tampered with.
5. a type indicator to indicate the type of function performed Other information may be supplied as well.

The security issues that arise in connection with the flexible architecture are obvious. The highly flexible plugin architecture permits many possible relationships between plugin components. In this system self-administer security.

The enumeration list provides a basis for each plugin to either opt-in or out according to its own determination of the propriety of interacting with the other plugins in the enumeration list. The system keeps all the extracted information in enumeration list. The system may prevent plugins from seeing the information if the plugin is not in the chain. If a plugin opts out, the system goes into another election (volunteer) round to find a replacement. The system only runs complete files through the system once all plugins have opted in and give their OK.

The host system may have provisions allow one plugin to communicate with another plugin to negotiate a trust relationship. For example, if a multi-function plugin were present, one plugin may only interoperate with it if one of the functions was disabled.

The contracts enforced by the plugins take place outside the context of the device. The above is simply an enforcement mechanism for the contracts. Thus, plugins are programmed in accordance with the external contracts to insure enforcement.

From a technical standpoint, all the pieces of the above interaction puzzle are well established. The contract terms can be embedded in a digital watermark or explicitly written into a header of the file. Plugin components can contain contract as well. One plugin can agree to be connected to accept data or apply to data only to certain other plugin components and such connections can be further dependent on the type of data to be exchanged.

It is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

The invention will be described in connection with certain preferred embodiments, with reference to the following illustrative figures so that it may be more fully understood. With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

It will be evident to those skilled in the art that the invention is not limited to the details of the foregoing illustrative embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A computer readable medium containing executable program instructions that, when executed by a data processing system, perform the steps of, creating a host process capable of accepting modular software components that are interchangeable to form multiple software processes;

receiving data at said host process from at least one of said modular software components indicative of at least a size of a test data sample;

permitting access to a sample of a data stream no greater than said size; and receiving a request from said at least one of said modular software components, responsive to said sample, to be connected to another modular software component accepted by said host process.

2. A system as in claim 1, wherein said modular software component is a plugin.

3. A method of implementing security in a plugin program, comprising the steps of:

testing a first plugin component to determine said first plugin's suitability for handling a first output, said first plugin component generating a second output;

testing a second plugin component to determine said second plugin's suitability for handling said second output;

selecting, responsively to respective results of said first and second steps of testing, said first and second plugin components for tentative connection for processing said first output to an end result;

generating a list identifying said first and second plugins;

permitting said first and second plugins to access said list and to generate respectively acceptance indicators responsively to a content of said list; and connecting said second output to an input of said second plugin responsively to each of said acceptance indicators.

4. A method of using a resource in a file, comprising the steps of:

connecting a file reader to a data source;

supplying test data to a file format handler;

indicating a compatibility of said file handler with said test data;

generating an instance of said file format handler; and connecting an output of said file reader to an input of said instance of said file format handler responsively to a result of said step of indicating.

* * * * *